United States Patent
Zimmerman et al.

(10) Patent No.: US 7,538,939 B2
(45) Date of Patent: May 26, 2009

(54) STEREOMICROSCOPE OR ADDITIONAL ELEMENT FOR A STEREOMICROSCOPE

(75) Inventors: Heinz Zimmerman, Balgach (CH); Ruedi Rotterman, Berneck (CH); Peter Bertschi, Alstätten (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 187 days.

(21) Appl. No.: 10/533,620

(22) PCT Filed: Oct. 14, 2003

(86) PCT No.: PCT/EP03/11346

§ 371 (c)(1),
(2), (4) Date: Apr. 18, 2006

(87) PCT Pub. No.: WO2004/040352

PCT Pub. Date: May 13, 2004

(65) Prior Publication Data

US 2006/0221441 A1 Oct. 5, 2006

(30) Foreign Application Priority Data

Oct. 31, 2002 (DE) .............. 202 16 929 U

(51) Int. Cl.
*G02B 21/00* (2006.01)
*G02B 21/06* (2006.01)

(52) U.S. Cl. .............. 359/381; 359/368; 359/385

(58) Field of Classification Search .......... 359/368–390
See application file for complete search history.

(56) References Cited

U.S. PATENT DOCUMENTS

| | | | | |
|---|---|---|---|---|
| 4,492,441 A | * | 1/1985 | Hopkins | 359/377 |
| 4,697,893 A | * | 10/1987 | Fehr et al. | 359/377 |
| 5,349,468 A | * | 9/1994 | Rathbone et al. | 359/390 |
| 6,930,828 B2 | * | 8/2005 | Faber | 359/381 |
| 2002/0034001 A1 | | 3/2002 | Faber | 359/385 |

FOREIGN PATENT DOCUMENTS

| | | |
|---|---|---|
| DE | 3327672 | 2/1985 |
| DE | 19542827 | 5/1997 |
| EP | 0167926 | 1/1986 |
| EP | 0170857 | 2/1986 |
| EP | 0730181 | 9/1996 |
| EP | 0816893 | 1/1998 |
| EP | 1010030 | 6/2000 |
| EP | 1217413 | 6/2002 |
| WO | WO99/13370 | 3/1999 |

* cited by examiner

*Primary Examiner*—Thong Nguyen
(74) *Attorney, Agent, or Firm*—Simpson & Simpson, PLLC

(57) ABSTRACT

A stereomicroscope having a carrier (12) bearing a microscope body (4) displaceable obliquely relative to a displacement direction of a focus-adjusting mechanism (9). A binocular beam splitter (2a) is used to combine two stereoscopic observation beam paths (3a, 3b) into a common beam path (3c), wherein the axes of the two observation beam paths (3a, 3b) entering into the binocular beam splitter (2a) and the axis of the beam path (3c) emerging from the binocular beam splitter (2a) are parallel to each other, and the axis of the emerging beam path (3c) is disposed at displacement (Vs) from a symmetry axis of the two entering observation beam paths (3a, 3b). Displacement of the carrier being able to compensate for displacement (Vs). A switching device (5) is provided that can be activated to bring lenses (6, 7) over an object (8) parfocally and parcentrically.

28 Claims, 7 Drawing Sheets

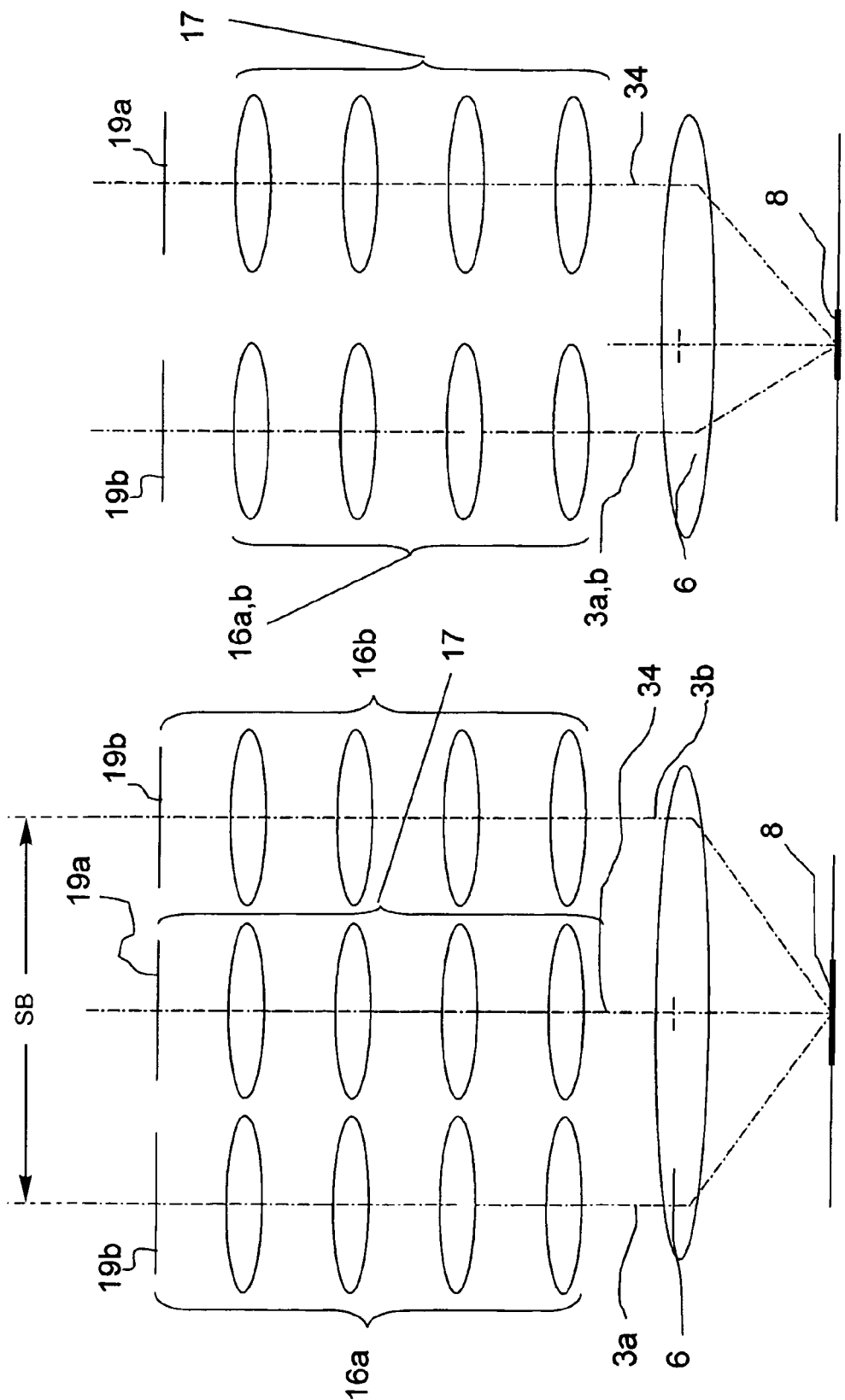

STEREOMICROSCOPE OR ADDITIONAL ELEMENT FOR A STEREOMICROSCOPE

BACKGROUND OF THE INVENTION

The invention relates to a stereomicroscope or to an additional element for a stereo-microscope with the ability to switch between different observation modes of which one is a stereoscopic observation mode through a stereo lens and the other a binocular monoscopic observation mode through a compound lens, the stereo lens and the compound lens being rotatably supported in a switching device in the stereoscopic beam path, and a prism arrangement being provided which during observation through the compound lens combines the two beam paths to form a single beam path.

Such a stereomicroscope is described in US-A1-2002/0034001 published Mar. 21, 2002. This known stereomicroscope, in the direction of an observation beam path, includes a binocular tube and an automatic prism displacement mechanism with a binocular beam splitter that can be displaced by means of a control cable for the purpose of linking the binocular tube with either both stereoscopic observation beam paths or with just one of the two observation beam paths. This stereomicroscope also includes a microscope body accommodating the stereoscopic observation beam paths and a switching device rotatably supported on a microscope holder for a microscope body. The switching device holds a stereo lens and two compound lenses.

The microscope body, in turn, is supported on a focus-adjusting mechanism so as to be displaceable in a direction oblique to the observation beam paths. The displaceability is required to be able, in the use position, to place both the stereo lens and each compound lens centrally over the object. Because the compound lens comes to rest underneath one of the two stereo observation beam paths, however, such a displacement must amount to one-half the distance between the axes of the observation beam paths when it is desired to position the observation beam in the two observation modes relatively equally to the object. In the use position, all cited lenses are thus parcentric and parfocal. The displacement of the microscope body on its focus-adjusting mechanism is brought about by a gear that automatically causes the displacement as a function of the position of the switching device. The gear, in turn, is connected to the control cable which in turn acts on a lever mechanism with which the binocular beam splitter can be displaced.

The known microscope thus involves a complicated design with two gears and a cable connection between them. The microscope is also integrally configured, to the extent that it shows a priori this functionality of the switchable observation possibilities and that it cannot give up this functionality and thus the gears, the binocular beam path splitter and the displaceability relative to the focus-adjusting mechanism, namely that to achieve this functionality a conventional stereomicroscope can only be reconfigured but not retrofitted. In other words, this prior art does not relate to an additional element for a stereo-microscope.

Moreover, control cables are components that are not thought to be particularly reliable so that, for example, optionally they must be readjusted or serviced.

This known microscope is provided with a fluorescence excitation illumination which makes it possible to make both stereoscopic observation and fluorescence observation through a compound lens. Here, in the case of incident fluorescent light excitation, the fluorescent light passes through the right partial stereo beam path. This can be disadvantageous, because in this beam path autofluorescence phenomena can occur or such phenomena must be prevented by use of special measures. In particular, the induced fluorescence illumination reduces the contrast reflection of the fluorescent object. Although a second fluorescence excitation illumination is also provided, this illumination is directed onto the object as transmitted light illumination via a stand base of the microscope and is not available for incident light illumination.

Additionally, EP patent publication EP-B1-170857 describes a microscope with a binocular tube wherein by means of a compound lens it is possible to switch a stereomicroscope from normal stereoscopic observation to binocular observation. The drawback of such a configuration is that it does not allow compensation for a misalignment when during binocular observation the object field is changed to an object field under stereoscopic observation. To this extent, this prior art is less appropriate from a practical standpoint than is the solution according to the afore-said prior art with automatic compensation of a misalignment. This known configuration provides no solution for observations in fluorescent light.

Although EP-B1-170857 thus also discloses a stereomicroscope with a switching device for a compound lens and a stereo lens on a stereomicroscope, a switching device is not provided with a gear and does not allow automatic compensation for misalignment. Furthermore, this known configuration is not provided with a displaceable carrier. In view of the lack of any means for compensating for misalignment and especially the lack of a displaceable carrier, it could therefore not be obvious to mount a binocular beam splitter between a carrier and a compound lens, for purposes of compensation. Moreover, the use of structure as described in EP-B1-170857 would have resulted in loss of parcentricity so that a mere takeover of the known arrangement not could not be obvious but would not have led to the desired result of overcoming disadvantages in the prior art.

EP-B1-167926 also reveals a binocular tube microscope that permits lateral displacement of an optical system carrier so that the axis of the lens can be brought into coincidence with the axis of a zoom channel. From this prior art, too, no teaching can be derived concerning an improvement over prior art patent publication US-A1-2002/0034001.

EP-A1-1010030 discloses a system for stereoscopic observation in incident fluorescent light with a particularly advantageous third zoom channel through which the illumination beam path is guided. This system suppresses the disturbing autofluorescence, but does not provide a basis for selectively observing objects through a stereo lens or through a compound lens.

BRIEF SUMMARY OF THE INVENTION

On the basis of this described prior art, the invention has for a main object to improve the microscope as described in US-A1-2002/0034001 so that it will be more compact and simple. In particular, it is to have fewer gears, no control cable or the like and, hence, should have a more robust and simpler configuration. It would be particularly preferred if the configuration needed for the afore-mentioned functionality could be retrofitted as an additional element for conventional stereomicroscopes. It would also be preferred if the microscope, including the known microscope, could be used as a fluorescence microscope, but with illumination guidance improved in a manner such that autofluorescence could be reduced by simple measures.

The main objective is reached through the features as described below. In particular, the invention includes a stereomicroscope with a binocular tube (1); with a microscope body (4); with a microscope holder (14) that is connected to a focus-adjusting mechanism (9), the focus-adjusting mechanism (9) in turn being fastened to a stand (13); with a carrier (12) bearing the microscope body (4) and being displaceable obliquely relative to the displacement direction of the focus-adjusting mechanism (9); with a binocular beam splitter (2a) used to combine the two stereoscopic observation beam paths (3a, 3b) into a common beam path (3c), wherein the axes of the two observation beam paths (3a, 3b) entering into the binocular beam splitter (2a) and the axis of the beam path (3c) emerging from the binocular beam splitter (2a) are parallel to each other, and the axis of the emerging beam path (3c) is disposed at distance (Vs) from the symmetry axis of the two entering observation beam paths (3a, 3b) it being possible to compensate for said displacement (Vs) by the displacement range of the carrier; (12) with a switching device (5) held on a holder (14) and provided with mounts for at least one stereo lens (6) and at least one compound lens (7), wherein by actuating the switching device (5) the lenses (6, 7) can selectively be brought over an object (8) and both the stereo lens (6) and the compound lens (7) can be placed over the object (8) parfocally and parcentrically; and with a gear (10) which, depending on the position of the switching device (5), automatically brings about the displacement of the carrier (12) wherein the binocular beam splitter (2a) is disposed between the carrier (12) and the compound lens (7).

The invention further includes a stereomicroscope, as described above, configured as an incident light stereomicroscope, with a binocular tube (1), with a microscope body (4) comprising an incident-light illumination system or a connection therefor, particularly an incident fluorescent light illumination system fitted with exciter and blocking filters (19a, 19b), with a microscope holder (14) connected to a focus-adjusting mechanism (9), where the focus-adjusting mechanism (9) is in turn fastened to a stand (13), with a carrier (12) bearing the microscope body (4), the carrier being displaceable relative to the holder (14) across the displacement direction of the focus-adjusting mechanism (9), with a binocular beam splitter (2a) used to bring together the two stereoscopic observation beam paths (3a, 3b) to form a common beam path (3c), wherein the axes of the two observation beam paths (3a, 3b) entering the binocular beam splitter (2a) and the axis of the beam path (3c) emerging from the binocular beam splitter (2a) are parallel to each other, and the axis of the emerging beam path (3c) shows a displacement (Vs) from the symmetry axis of the two entering observation beam paths (3a, 3b) which displacement can be compensated for by the displacement range of the carrier (12), with a system for coupling the illumination beam path (34) into the beam path (3c) emerging from the binocular beam splitter (2a), with a switching device (5) supported on the holder (14) and having mounts for at least one stereo lens (6) and at least one compound lens (7), wherein by actuating the switching device (5) the lenses (6, 7) can selectively be brought over an object (8) and both the stereo lens (6) and the compound lens (7) can be placed over the object (8) parfocally and parcentrically, with a gear (10) which, depending on the position of the switching device (5), automatically brings about the displacement of the carrier (12), wherein in the microscope body (4) there is provided besides the stereoscopic observation beam paths (3a, 3b) an illumination beam path (34) which is separated from the observation beam paths and is preferably parallel thereto and which, when the stereo lens (6) is selected, passes through said lens.

The invention also includes the above wherein an additional element for a stereomicroscope, in particular, as described above with a microscope holder (14), with a gear (10), with a carrier (12) for a microscope body that can be displaced relative to the holder (14) and with a switching device (5) supported on the holder (14) and provided with lens mounts for at least one stereo lens (6) and at least one compound lens (7), as well as with a binocular beam splitter (2a), wherein all said components form a single unit which can selectively be connected with or detached. A system (15) for coupling an illumination beam path (34) into the beam path (3c) emerging from the binocular beam splitter (2a) may further be a part of the single unit. The compound lens (7) from a group of such lenses can be selectively and interchangeably connected with the one of the switching device (5), the binocular beam splitter (2a), and the illumination coupling-in system (15).

The stereomicroscope may have the holder (14), the gear (10), the displaceable carrier (12) and the switching device (5) form with the lens mounts and the binocular beam splitter (2a) and the illumination coupling-in system, a single unit which selectively can be connected to or detached from the microscope body (4).

The stereo lens (6) can be selected from a group of stereo lenses or switched with a lens from such a group.

The holder (14) may be L shaped, the short part of the "L" being fastened to the focus adjusting mechanism (9).

The system for illumination in-coupling (15) may include a mirror (42) and a second beam splitter (43) disposed between the binocular beam splitter (2a) and the compound lens (7).

The second beam splitter (43) may be configured as a flat component with main boundary surfaces extending parallel to the beam splitter surface.

BRIEF DESCRIPTION OF THE SEVERAL VIEWS OF THE DRAWINGS

FIG. 2 shows a front view of a schematic representation of the observation beam paths 3a, 3b, and an illumination beam path 34 with a stereo lens 6 put into position;

FIG. 3 shows a side view of the representation of FIG. 2;

DETAILED DESCRIPTION OF THE INVENTION

Figure 1:
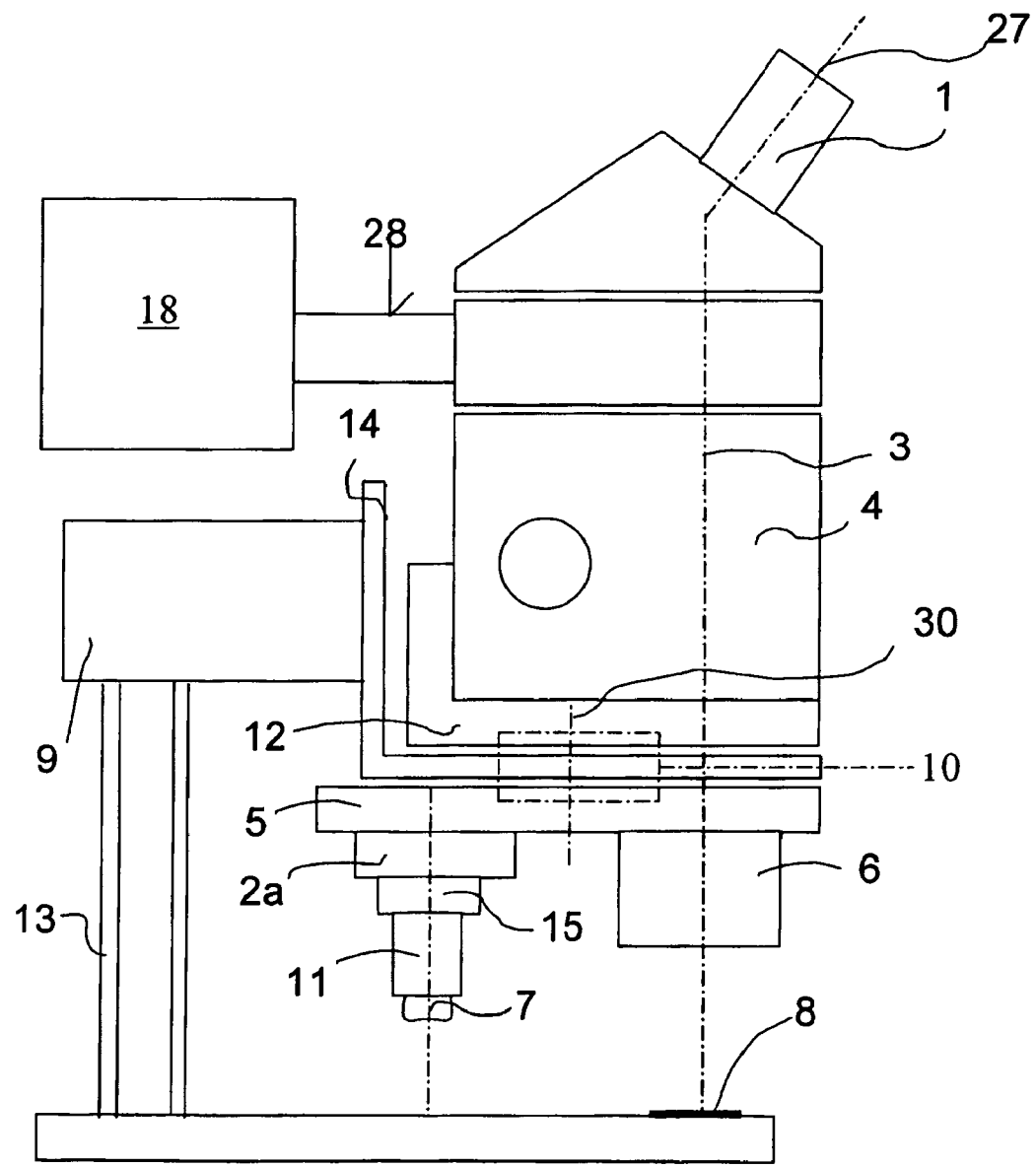
FIG. 1 shows the symbolic overall configuration of a microscope of the invention.

Refinements of the above described microscopes lead to further improved microscopes and, in particular, also provide solutions for the other objects. This main objective is also reached in the case of a microscope with incident illumination in that, while the switching system and the devices connected thereto are retained, the beam path for the illumination is also incorporated in integrated fashion.

In the sense of the invention, the terms used in this application can be explained as follows. By stereomicroscope is meant both a surgical microscope and a conventional stereomicroscope. By binocular tube is meant a conventional binocular tube as well as an assistant's binocular tube or a binocular connection to an image-uptaking device. A binocular beam splitter is a beam splitter that photo-optically combines the binocular observation beam paths with a single partial beam path of a stereoscopic microscope beam path and, for example, can be configured as a mirror or prism. Frequently, how-ever, it is used as a binocular splitter prism. In particular, the invention comprises the use of a Y-prism so that, if necessary, the need for displacement or a displacement mechanism or a gear is eliminated. A Y-prism in the sense of the invention is a beam splitter with two entering beams and one emerging beam, with all three beams being in the same plane and the axis of the emerging beam path coinciding with the symmetry axis of the two entering beam paths.

The use according to the invention of such a Y-prism, however, would make it necessary for the axes of the observation beam paths and of the lenses—in the use position—to be in the same plane. By use of other prisms, it is possible to displace the axis of the compound lens to the side in the plane defined by the axes of the two observation beam paths so that the design can be more compact or so that more space can be provided for an illumination beam path.

By microscope body is meant a three-dimensional component that accommodates the observation beam paths of the stereomicroscope and any separate illumination beam paths that may be present. In most cases, the beam paths accommodate at least one zoom. All zooms are preferably coupled either mechanically or electrically.

A switching device or a displacement device according to the invention is mounted rotatably or displaceably on the holder and comprises a rotary bearing or at least one guide rail as a well as a plate with supports on which there is disposed or can be fastened at least one stereo lens and at least one compound lens. Preferably, said device is pro-vided with latches or the like so that it can be fixed in a preferred position or can be used when desired.

By focus-adjusting mechanism is meant a mechanical or motorized mechanism whereby the microscope body can be displaced in the focus direction (Z-direction) relative to a stand and thus relative to an object.

By compound lens is meant a lens with relatively large magnification through which, as a result of the binocular beam splitter, both observation beam paths are guided congruently toward each other. To improve brightness, a refinement can be provided at the binocular beam splitter making it possible to remove said splitter from the beam path as desired with the result that the observer looks through only one of the stereoscopic beam paths.

By a gear is meant a device that transfers the movement of a component or a position of a component to another component. Within the framework of the invention, such a gear can be mechanical, motorized, pneumatic, hydraulic, electric or electronic. In any case, the transfer occurs automatically. The purpose of actuating the switching device is to save the observer the effort to have to reposition the lens after he or she had switched lenses.

In a particular embodiment, according to the invention, the displacement of the micro-scope body in this case takes place in the X and Y directions to compensate for a misalignment of the lens axis relative to the plane formed by the two axes of the observation beam paths. This means according to the invention that the displacement path of the carrier is longer than one-half the distance SB between the two axes of the observation paths.

Alternatively, such a gear could displace not only the microscope body but also the lens or the lens carrier. This, however, would cause the object to move, which perhaps would be undesirable. Such a conceivable variant could not be used in surgical microscopes, because they do not have an object carrier.

According to the invention, therefore, the parts needed for the switching between the modes of observation—and particularly also for use under fluorescence conditions—are disposed in a single component group. The switching or displacement of the switching device alone is sufficient to bring about the change from stereoscopic to binocular observation. The novel configuration allows retrofitting of conventional stereomicroscopes and particularly of conventional fluorescence stereomicroscopes without causing stray light components to appear.

In a particular embodiment, according to the invention, the coupling-in of illumination in the region of the compound lens takes place through a flat component group that is pushed in obliquely to the axis of the compound lens. As a result of this configuration, the coupling into the component unit consisting of the compound lens and binocular beam splitter can be achieved in a compact manner. Moreover, the mounting of such a flat component unit of the invention involves only a minor fabrication cost.

The beam splitter for coupling in the illumination can be solidly built in as a neutral-gray splitter, because, through the filter module, the exciter filter and blocking filter can already bring about the desired fluorescence of the fluorescence microscope (cf., for example, EP-A1-1010030).

The beam splitter for coupling in the illumination can also be configured as a dichroic beam splitter. Independent switching between the exciter-blocking filter and the dichroic splitter provides greater flexibility in terms of fluorescence excitation and fluorescence observation.

Other refinements based on a microscope as defined in the brief summary of the invention give rise to the following effects or advantages, among others:

A rigid connection between the binocular beam splitter and a mount for the compound lens results in a more compact construction. The effect of this is that the binocular beam splitter and the lens can be moved simply and at the same time and are thus spatially always in optimum orientation relative to one another.

Because the lens mounts and the focal lengths of the lenses are always subject to tolerances, it is advantageous that the compound lens comprises a fine-focusing device, and particularly that during the switching from the stereo lens to the compound lens the operator's hand is there.

Retrofitting ability is optimized when the switching device and the gear form a single assembly unit with lenses, binocular beam splitter, holder, carrier and displacement device.

Preferably, the stereo lens is laterally adjustable so as to establish parcentricity with the compound lens, because the mount and the lens holders can be subject to tolerances. Preferably at least one mount is provided that includes an adjustable system for adjusting the lens (7) preferably in a direction across the lens axis. Desirably, the stereo lens can be selected from a group of stereo lenses or switched with a lens from such a group.

If illumination coupling-in is provided between the compound lens and the binocular beam splitter, then incident-light illumination can be used also in the compound observation mode. The invention is preferably to be applied in fluorescence stereomicroscopes in which the light source for the illumination beam path is an exciting light source with a certain exciting light frequency, for example UV, so that the blocking filters are preferably disposed on the microscope body and/or in the binocular beam splitter. Optionally, the blocking filters are already disposed under the microscope body or in the lower region thereof, because in this manner the observation beam paths can be kept free of exciting light over long distances, which in the prior-art microscopes is not possible.

As is known per se, the invention comprises a filter turret or a filter drawing device for different filter applications in fluorescence microscopy. In this regard, the reader is referred to the figures and figure descriptions in EP-A1-1010030 where particularly suit-able filter holders are described. The figures and figure descriptions in the cited patent are hereby incorporated into the present patent application by reference. The same applies to the filter construction of the prior art, US-A!-2002/0034001.

With a fluorescence stereomicroscope according to EP-A1-1010030, the advantages of the configuration preferred according to the invention lie in a separate third illumination channel, in an advantageous filter arrangement and in an optimum utilization of the lens pupil for observation beam paths and illumination beam path as a result of the displacement of the lens axis toward the symmetry axis of the observation channels.

The objectives are reached through the afore-described invention and the variants thereof.

The reference symbol list and the drawings, together with the objectives described in the claims or with the protected subject matter are an integral part of the disclosure of this patent application.

The invention will now be explained in exemplary and non-restricting manner by reference to the drawings.

The figures are described in linked and overlapping fashion. Equal reference symbols mean equal components, and reference symbols with different indices refer to components with the same function.

FIG. 1 shows symbolically and schematically the overall configuration of a microscope of the invention. It comprises—in the direction of an observation beam 27—a binocular tube 1, an incident light illumination system 28 and a microscope body 4 that accommodates the stereoscopic observation beam paths 3a, 3b (which coincide with the observation beam 27) and an illumination beam path 34. Microscope body 4 is held by a carrier 12 which permits displacement in the X and/or Y direction obliquely to the observation beam paths 3a, 3b and is disposed on an L-shaped microscope holder 14. Said holder in turn is supported via a focus-adjusting mechanism 9 disposed on a stand 13 and permitting displacement in height. The focus-adjusting mechanism is preferably held by an L shaped holder 14, the short part of the "L" being fastened to the focus adjusting mechanism (9). A switching device 5 holds a stereo lens 6 and a compound lens 7 which can be selectively swiveled in front of the stereoscopic observation beam paths 3a, 3b in the microscope body 4. The switching device 5 is fastened via rotation axis 30 to L-shaped holder 14.

The switching device is needed to be able to center stereo lens 6 as well as compound lens 7 over object 8. Because, however, as a result of the arrangement the binocular beam splitter 2a, compound lens 7 ends up being positioned below one of the two stereoscopic observation beam paths 3a, 3b, such a displacement of carrier 12 must occur over a length equal to one-half the distance between the axes of the two observation beam paths 3a, 3b, when one wants to position observation beam path 27 relatively equally with respect to object 8. Thus, in the use position all said lenses 6 and 7 are parcentric and parfocal. The displacement of carrier 12 of microscope body 4 relative to holder 14 is brought about by a gear 10 which automatically causes the displacement to take place depending on the position of switching device 5. Located ahead of compound lens 7 are a focus-adjusting device 11, an illumination coupling-in system 15 and a binocular beam splitter 2a. Illumination coupling-in system 15 makes it possible to couple the illumination light from an illumination beam path 34 into compound lens 7 for incident light illumination of objective 8 (FIG. 3).

FIG. 2 shows schematically the optical details of beam paths 3a, 3b, 34 in microscope body 4 with stereoscopic lens 6 placed in position as in FIG. 1. Filters 19a and 19b serve in the known manner as exciter and blocking filters under conditions of fluorescence observation. Beam path 3a indicates the left observation beam path the axis whereof is indicated by a dot-dash line and 3b indicates the right observation beam path the axis of which is shown as a dash-dot line. Both beam paths run through filter 19b and zoom systems 16a, 16b, and by means of stereo lens 6 are focused on object 8. Moreover, an illumination beam path 34 is indicated by its axis. Said path passes through a filter 19a and a zoom 17 and by lens 6 is also focused on object 8.

Although, for better representation, all zooms 16, 17 are shown in one drawing plane one next to each other, illumination beam path 34 optionally lies in a plane different from that of observation beam paths 3a, 3b, and in a top view would partly cover said paths. Zooms 16a, 16b, 17 are—preferably and as per se known—linked to one another mechanically or electrically.

Figure 6:
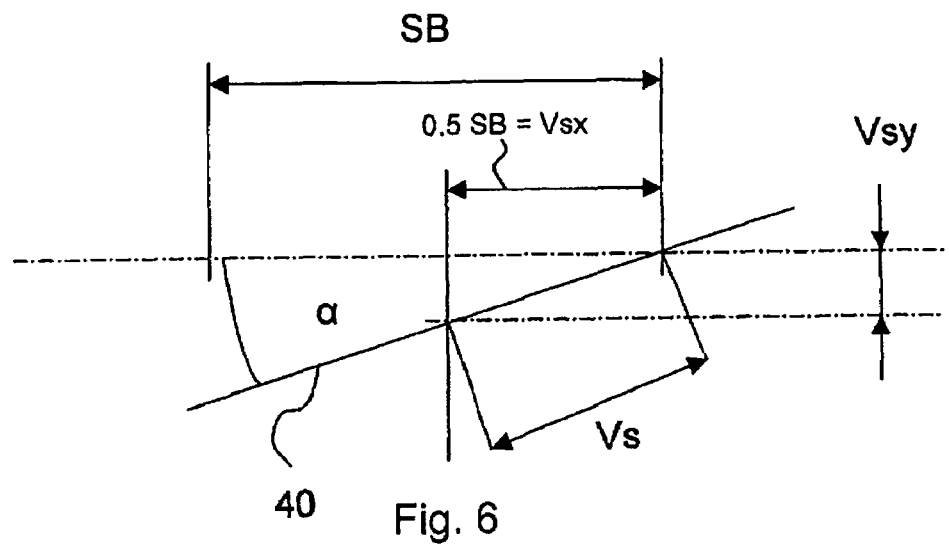
FIG. 6 shows a schematic representation of the displacement of the carrier relative to the holder.

FIG. 3 shows a side view of the configuration according to FIG. 2 from which it can be seen that the axis of observation beam path 3b and thus also that of observation beam path 3a lie in a common plane. The axes of observation beam paths 3a, 3b and the axis of illumination beam path 34 are parallel to the axis of lens 6. All axes 3a, 3b, 34 are separated by a distance from one another. The distance between the two observation beam paths 3a and 3b is indicated in FIG. 6 by SB. The axis of lens 6 lies in a plane with respect to which the two observation beam paths 3a, 3b are mirror-symmetric.

Figure 4:
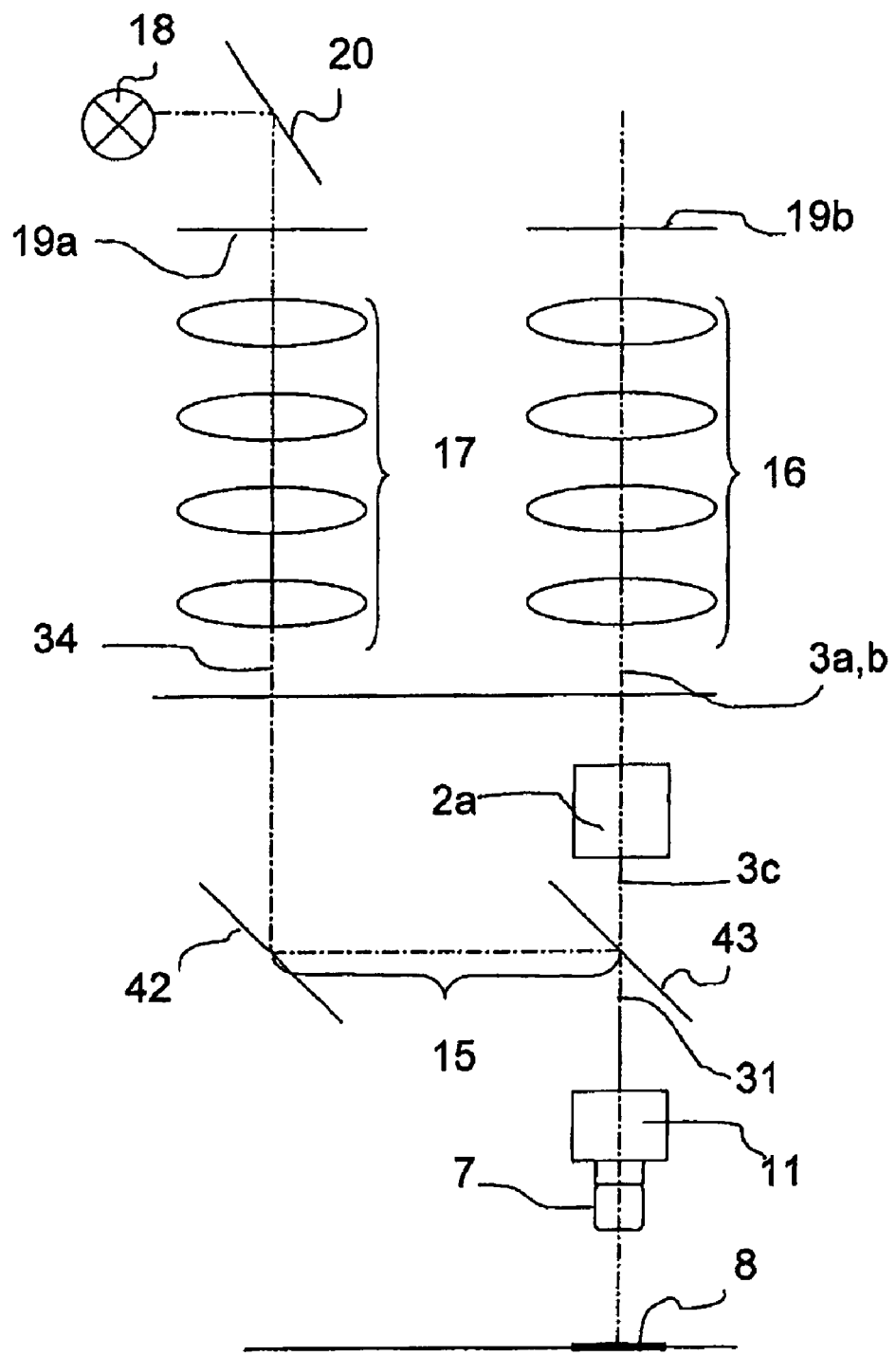
FIG. 4 shows a schematic representation of the observation beam paths 3a, 3b, and of the illumination beam path 34 in side view with compound lens 7 put into position.

FIG. 4 is a side view of the schematic representation of the optical details of the microscope according to FIG. 1 with the compound lens 7 placed into position. The axis of the illumination beam path 34 is shown as a dash-dot line. The illumination beam path 34 which originates at the light source 18 is switched by a switching element, for example by a mirror 20, and passes through an exciter filter 19a and zoom 17 and enters the coupled-in illumination 15. The device for illumination in-coupling 15 preferably comprises an adjustable mirror 42. In said illumination, a mirror 42 guides the beam path onto a beam splitter 43 which congruently combines illumination beam path 34 with observation beam path 31 (which coincides with the emerging beam path 3c) of compound lens 7. Desirably, the second beam splitter 43 is configured as a flat component with main boundary surfaces extending parallel to the beam splitter surface.

Figure 5:
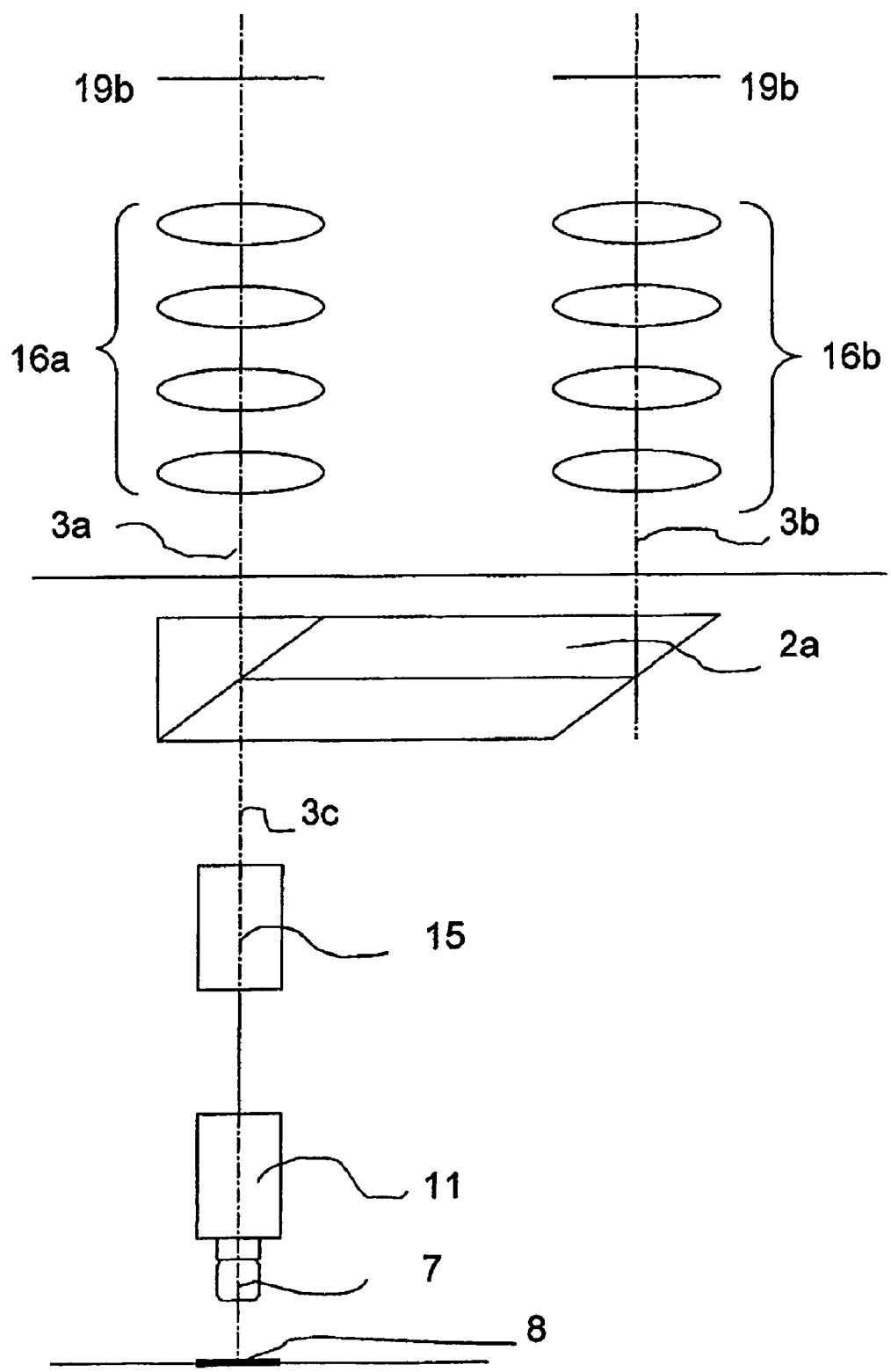
FIG. 5 shows a schematic representation of the observation beam paths 3a, 3b when the compound lens is put into position.

FIG. 5 shows the front view of the configuration in the position according to FIG. 4, from which it is also possible to see the configuration of binocular beam splitter 2a. As can be seen, compound lens 7 is disposed in the prolongation of left observation beam path 3a. To compensate for the dislocation relative to the position of stereo lens 6, microscope body 4 or the carrier thereof 12 must be displaced to the left (X-direction)—in the plane of the drawing—for one half the distance between the axes of observation beam paths 3a, 3b. Other displacements—perpendicular to or across the plane of the drawing (Y-direction)—are advantageous or necessary when the axis of the stereo lens 6 is not in the plane of the two observation beam paths 3a, 3b and/or when the binocular beam splitter 2 causes a beam displacement also in the Y-direction.

FIG. 6 shows the misalignment path Vs consisting of two misalignment components Vsx and Vsy. A line here shows the effective direction 40 that is to be reached as a result of the displacement. Effective direction 40 is disposed toward the two observation beam paths 3a, 3b at an angle α to the plane passing through the two observation beam paths 3a, 3b that are disposed at a distance SB from one another.

Figure 7:
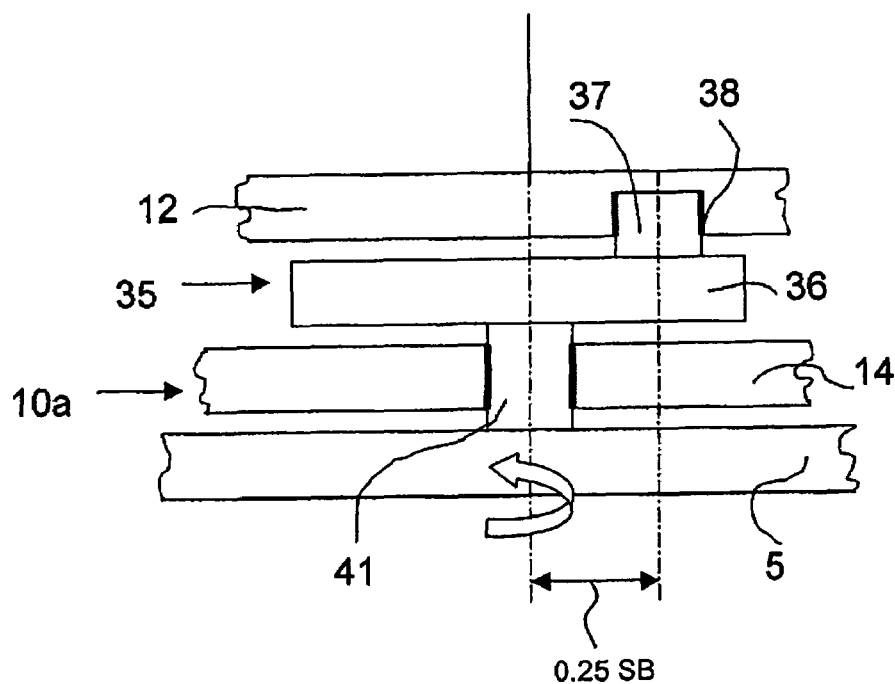
FIG. 7 shows a schematic configuration of a gear with a crank mechanism 35 and a cam 36 in cross-section.

FIG. 7 shows the possible use of a gear 10a according to the invention that is provided with a crank mechanism 35 having crank pin 37 and cam 36, said cam 36 being rotatably held in holder 14 and the crank pin 37 engaging into a longitudinal groove 38 of carrier 12. A journal 41 of cam 36 is rigidly connected with a switching device (turret) 5 so that a rotation of the turret actuates the cam 36. Depending on the effective direction 40, this actuation brings about the displacement of carrier 12 over the distance Vs. Such an arrangement permits a rotation of 360°.

Figure 8:
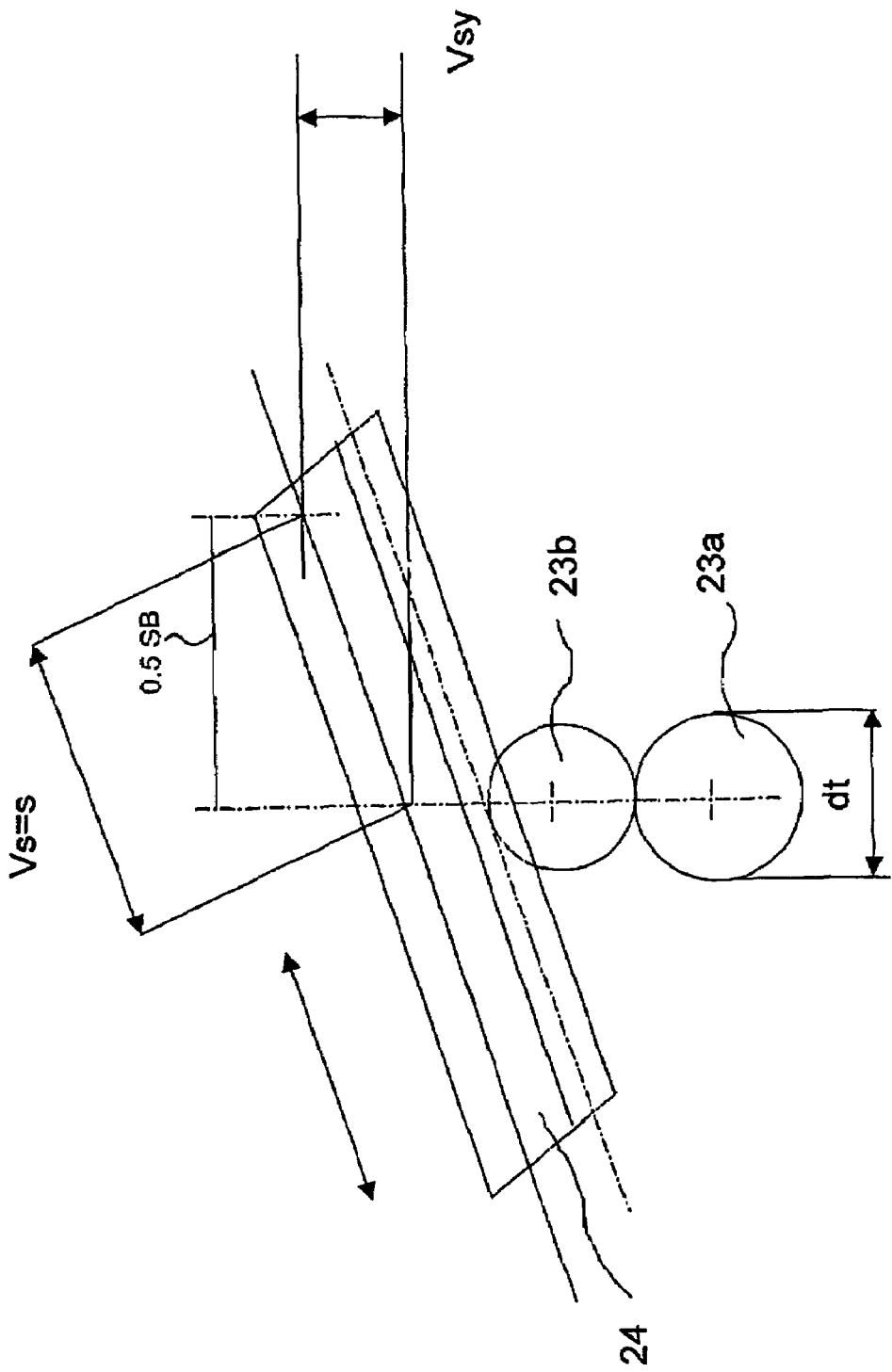
FIG. 8 shows a schematic configuration of a gear with two gear wheels 23a, 23b, and a gear rack 24.
Figure 9:
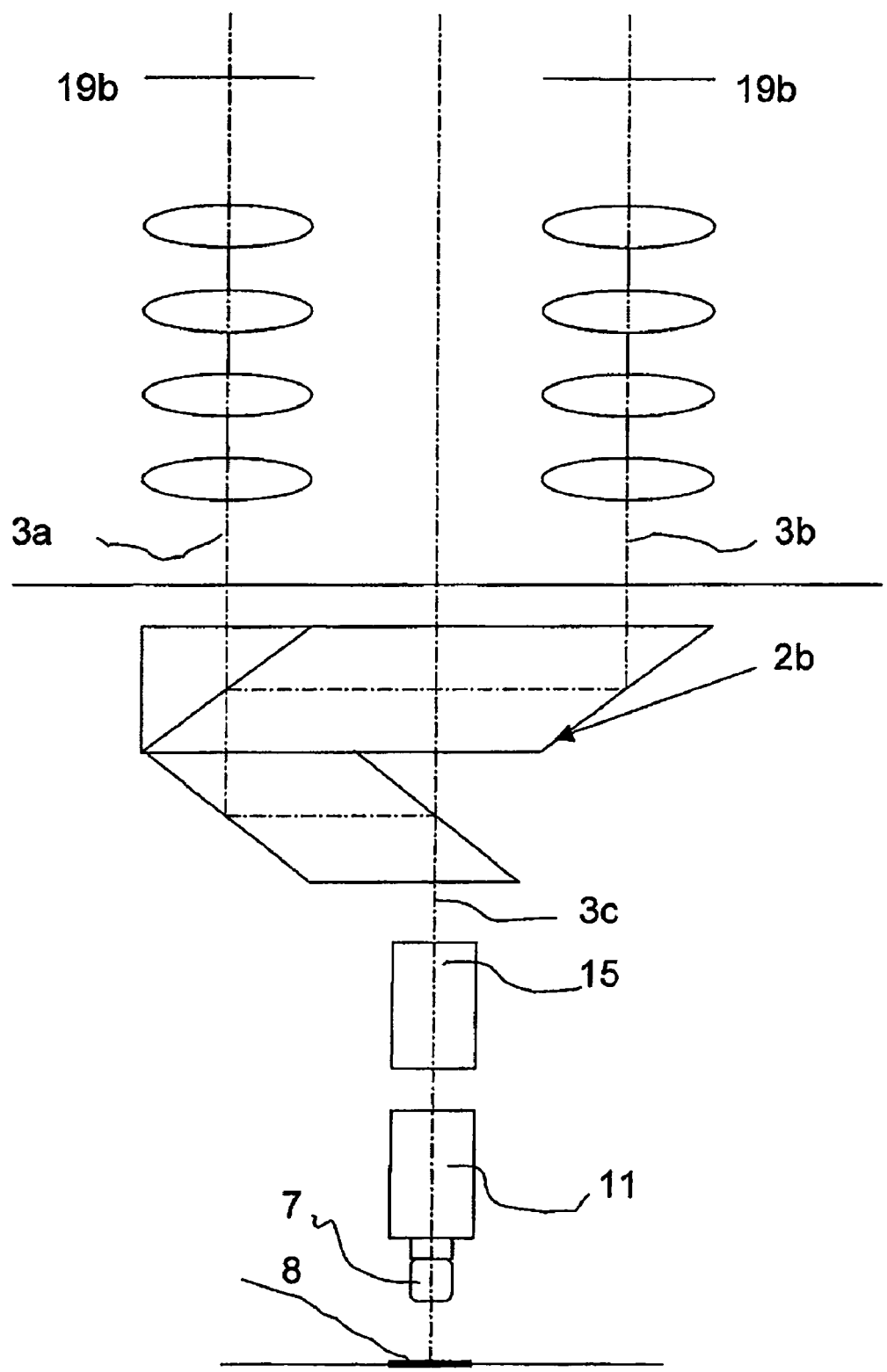
FIG. 9 shows a schematic configuration with a Y-prism 2b which makes it possible to eliminate the need for displacing carrier 12 as long as the axis of compound lens 7 coincides with the symmetry axis of both observation beam paths 3a and 3b.

In FIG. 8 is shown a comparable configuration but without crank mechanism 35 and, instead, provided with gear wheels or pinions 23a and 23b, gear wheel 23b being provided only optionally. Gear wheel 23a is driven by switching device 5 and rotated through 180°. If the circumference thereof is dt=2s, the desired displacement Vs is achieved by moving gear rack 24 in the effective direction 40.

LIST OF REFERENCE SYMBOLS

| | List of Reference Symbols |
|---|---|
| 1 | Binocular tube |
| 2a | Binocular beam splitter |
| 2b | Y-prism |
| 3 | Stereoscopic observation beam paths |
| | 3a left partial observation beam path |
| | 3b right partial observation beam path |
| | 3c beam path emerging from beam splitter 2a and combining in itself partial observation beam paths 3a, 3b |
| 4 | Microscope body |
| 5 | Switching device |
| 6 | Stereo lens |
| 7 | Compound lens |
| 8 | Object |
| 9 | Focus-adjusting mechanism |
| 10 | Gear |
| 11 | Fine-focusing mechanism |
| 12 | Carrier |
| 13 | Stand |
| 14 | Holder, microscope holder |
| 15 | Illumination coupling-in device |
| 16 a, b | Zoom in observation beam path 3a, 3b |
| 17 | Zoom in illumination beam path 34 |
| 18 | Light source |
| 19a | Filter, exciter filter |

-continued

| | List of Reference Symbols |
|---|---|
| 19b | Filter, blocking filter |
| 20 | Switching element, mirror |
| 20 a, b | Gear wheel or pinion |
| 24 | Gear rack |
| 27 | Observation beam |
| 28 | Incident-light illumination system |
| 30 | Rotational axis |
| 31 | Observation beam path of the compound lens |
| 34 | Illumination beam path |
| 35 | Crank mechanism |
| 36 | Cam |
| 37 | Crank pin |
| 38 | Longitudinal groove |
| 40 | Effective direction |
| 41 | Journal |
| 42 | Mirror, switching element |
| 43 | Beam splitter |
| Vs | Misalignment |
| Vsx | Misalignment component in the X-direction |
| Vsy | Misalignment component in the Y-direction |
| SB | Distance between the axes of the observation beam paths 3a, 3b. |

What is claimed is:

1. A stereomicroscope comprising:
  a binocular tube (1),
  a microscope body (4) for passing two stereoscopic observation beam paths (3a, 3b), the microscope body (4) comprising an incident light illumination system or connection therefor and an illumination beam path (34) separate from the observation beam paths such that when a stereo lens (6) is selected the illumination beam path passes through the lens (6),
  a microscope holder (14) that is connected to a displaceable focus-adjusting mechanism (9), the focus-adjusting mechanism (9) in turn being fastened to a stand (13),
  a beam splitter (2a) used to combine the two stereoscopic observation beam paths (3a, 3b) into a common beam path (3c), wherein the axes of the two observation beam paths (3a, 3b) entering into the binocular beam splitter (2a) and the axis of the beam path (3c) emerging from the binocular beam splitter (2a) are parallel to each other, and the axis of the emerging beam path (3c) is disposed at displacement (Vs) from a symmetry axis of the two entering observation beam paths (3a, 3b),
  a system for coupling an illumination beam path (34) into the beam path (3c) emerging from the binocular beam splitter (2a),
  a carrier (12) bearing the microscope body (4) and being displaceable obliquely relative to a displacement direction of the focus-adjusting mechanism (9) to compensate for said displacement (Vs),
  a switching device (5) held on said holder (14) and provided with mounts for at least one stereo lens (6) and at least one compound lens (7), wherein by actuating the switching device (5) each of the lenses (6, 7) can selectively be brought over an object (8) and both the stereo lens (6) and the compound lens (7) can be placed over the object (8) parfocally and parcentrically,
  a gear (10) which, depending on the position of the switching device (5), automatically brings about the displacement of the carrier (12) to compensate for displacement (Vs),
  wherein the binocular beam splitter (2a) is disposed between the carrier (12) and the compound lens (7).

2. A stereomicroscope as claimed in claim 1 wherein an incident light illumination system is configured as said incident fluorescent light illumination system fitted with exciter and blocking filters (19a, 19b).

3. A stereomicroscope as defined in claim 1 wherein a displacement range of the carrier (12) corresponding to the displacement (Vs) comprises path components corresponding to displacement components (Vsx, Vsy) in at least two directions (X/Y) of a plane.

4. A stereomicroscope as defined in claim 1 wherein the displacement range of the carrier (12) corresponds to a displacement range of the microscope body (4) such that the two stereoscopic observation beam paths (3a, 3b) can selectively
   a) pass through the stereo lens (6) or
   b) coincide with the inlet axes of the binocular beam splitter (2a).

5. A stereomicroscope as defined in claim 4 wherein the axes of the stereoscopic observation beam paths (3a, 3b) and the axis of the stereo lens (6) do not lie in a common plane.

6. A stereomicroscope as defined in claim 1 wherein the axes of the observation beam paths (3a, 3b) and the axis of the stereo lens (6) are parallel, and the axes of the observation beam paths (3a, 3b) are mirror symmetrical to each other with respect to a plane in which also lies the axis of the stereo lens (6).

7. A stereomicroscope as defined in claim 1 wherein the switching device (5) is configured as a rotatable turret or as a slider, the direction of movement of which is essentially parallel to a common plane of the two observation beam paths (3a, 3b).

8. A stereomicroscope as defined in claim 1 wherein the holder (14), the gear (10), the displaceable carrier (12) and the switching device (5) form with the lens mounts and the binocular beam splitter (2a), a single unit which selectively can be connected to or detached from the microscope body (4).

9. A stereomicroscope as defined in claim 1 wherein the holder (14), the gear (10), the displaceable carrier (12) and the switching device (5) form with the lens mounts and the binocular beam splitter (2a) and the illumination coupling-in system, a single unit which selectively can be connected to or detached from the microscope body (4).

10. A stereomicroscope as defined in claim 9, wherein the system for illumination in-coupling (15) comprises a mirror (42) and a second beam splitter (43) disposed between the binocular beam splitter (2a) and the compound lens (7).

11. A stereomicroscope as defined in claim 10, wherein the system for illumination in-coupling (15) comprises an adjustable mirror (42).

12. A stereomicroscope as defined in claim 10 wherein the second beam splitter (43) is configured as a neutral tint beam splitter.

13. A stereomicroscope as defined in claim 10 wherein the second beam splitter (43) is configured as a dichroic beam splitter.

14. A stereomicroscope as defined in claim 10 wherein the second beam splitter (43) is adapted to the filter properties of the exciter and blocking filters (19a, 19b) and can be selected from a group of beam splitters or switched with a beam splitter from such a group.

15. A stereomicroscope as defined in claim 10, wherein the second beam splitter (43) is configured as a flat component with main boundary surfaces extending parallel to the beam splitter surface.

16. A stereomicroscope as defined in claim 1, wherein the compound lens (7) from a group of such lenses can be selectively and interchangeably connected with the one of the switching device (5), the binocular beam splitter (2a), and the illumination coupling-in system (15).

17. A stereomicroscope as defined in claim 1, wherein the mount for the compound lens (7) comprises a fine focusing system (11).

18. A stereomicroscope as defined in claim 1, wherein at least one of the mounts comprises an adjustable system for adjusting the lens (7) in a direction across the lens axis.

19. A stereomicroscope as defined in claim 1, wherein the stereo lens (6) can be selected from a group of stereo lenses or switched with a lens from such a group.

20. A stereomicroscope as defined in claim 1, wherein the switching device (5) can be rotated through an angle of 360 degrees and is provided with latches.

21. A stereomicroscope as defined in claim 1 wherein the holder (14) is L shaped, the short part of the "L" being fastened to the focus adjusting mechanism (9).

22. A stereomicroscope as defined in claim 1, wherein beam splitter (2a) is a first beam splitter in the form of Y prism (2b).

23. A stereomicroscope as defined in claim 22 the carrier (12) and the gear (10) permit the microscope body (4) to be displaced exclusively in a single spatial direction (Y) for the purpose of introducing a displacement (Vsy) of the stereo lens (6) in this spatial direction (Y).

24. A stereomicroscope as defined in claim 23, wherein the displacement range of the carrier (12) corresponds to a displacement range of the microscope body (4) such that both stereoscopic observation beam paths (3a, 3b) pass through the stereo lens (6) parcentrically to the compound lens, wherein the axes of the observation beam paths (3a, 3b) and the axis of the stereo lens (6) are parallel, and the axes of the observation beam paths (3a, 3b) are mirror symmetrical with each other with respect to a plane in which also lies the axis of the stereo lens (6).

25. A stereomicroscope as defined in claim 1, wherein it is equipped as a surgical microscope without lens carrier and that for the switching device (5) a remotely controllable electric drive is provided to bring about remotely controlled switching between the two lenses (6,7).

26. A stereomicroscope as defined in claim 1, wherein the gear (10) comprises at least one gear wheel (23a, 23b) and one gear rack (24) or a crank mechanism (35) with a cam (36) which are disposed or configured so that during a displacement they bring about a displacement (Vs) with displacement components (Vsx, Vsy) in two spatial directions of a plane.

27. The stereomicroscope of claim 1 wherein the illumination beam path is parallel to the to the observation beam paths (3a, 3b).

28. An element for a stereomicroscope comprising a microscope holder (14), a gear (10), a carrier (12) for a microscope body that can be displaced relative to the holder (14) and a switching device (5) supported on the holder (14) and provided with lens mounts for at least one stereo lens (6) and at least one compound lens (7), as well as with a binocular beam splitter (2a), wherein all said components form a single unit which can selectively be connected with or detached from a focus adjusting mechanism (9) of a stand (13) and a microscope body (4).

* * * * *